United States Patent
Kawata et al.

(10) Patent No.: US 12,323,519 B1
(45) Date of Patent: Jun. 3, 2025

(54) DETECTING AND REMOVING INACTIVE ENCRYPTION KEYS DURING ENCRYPTION KEY ROLLOVER EVENTS

(71) Applicant: Juniper Networks, Inc., Sunnyvale, CA (US)

(72) Inventors: Jerry Kawata, Nepean (CA); Manjunath Ramappa Tahasildar, Ottawa (CA)

(73) Assignee: Juniper Networks, Inc., Sunnyvale, CA (US)

( * ) Notice: Subject to any disclaimer, the term of this patent is extended or adjusted under 35 U.S.C. 154(b) by 253 days.

(21) Appl. No.: 18/146,638

(22) Filed: Dec. 27, 2022

(51) Int. Cl.
*H04L 9/08* (2006.01)

(52) U.S. Cl.
CPC .......... *H04L 9/0891* (2013.01); *H04L 9/0825* (2013.01)

(58) Field of Classification Search
CPC ............................ H04L 9/0891; H04L 9/0825
See application file for complete search history.

(56) References Cited

U.S. PATENT DOCUMENTS

| | | | | |
|---|---|---|---|---|
| 8,634,560 | B1 * | 1/2014 | Ng ............................ | H04L 9/12 380/279 |
| 9,882,714 | B1 * | 1/2018 | Cignetti .................. | H04L 9/083 |
| 11,368,294 | B2 | 6/2022 | P N et al. | |
| 11,411,915 | B2 | 8/2022 | Hill et al. | |
| 11,570,162 | B1 * | 1/2023 | Mundra ............... | H04L 63/0435 |
| 2011/0150223 | A1 * | 6/2011 | Qi .......................... | H04L 9/0891 380/273 |
| 2019/0288842 | A1 * | 9/2019 | Weis ...................... | H04L 9/0891 |
| 2021/0351921 | A1 * | 11/2021 | P N ........................ | H04L 9/0827 |
| 2023/0361992 | A1 * | 11/2023 | Mundra ................ | H04L 9/0819 |

FOREIGN PATENT DOCUMENTS

CN 103209072 B 8/2017

OTHER PUBLICATIONS

Co-pending U.S. Appl. No. 17/662,481, entitled "Deleting Stale or Unused Keys to Guarantee Zero Packet Loss," by Sumeet Mundra, filed on May 9, 2022.

* cited by examiner

*Primary Examiner* — Baotran N To
(74) *Attorney, Agent, or Firm* — Harrity & Harrity, LLP

(57) ABSTRACT

A network device may install a new receive encryption key, and may start a timer associated with deleting an old receive encryption key. The network device may provide, to another network device, a message identifying the new receive encryption key, and may determine whether packet counts, successfully decrypted with the old receive encryption key, have changed. The first network device may determine whether the timer has expired, and may determine whether the new receive encryption key has successfully decrypted a packet. The first network device may delete the old receive encryption key from the first network device based on the new receive encryption key successfully decrypting a packet.

20 Claims, 14 Drawing Sheets

DETECTING AND REMOVING INACTIVE ENCRYPTION KEYS DURING ENCRYPTION KEY ROLLOVER EVENTS

BACKGROUND

Media access control security (MACsec) provides point-to-point security on Ethernet links. MACsec may be utilized in combination with other security protocols, such as Internet protocol security (IPsec) and secure sockets layer (SSL), to provide end-to-end network security. MACsec may utilize encryption keys (e.g., referred to herein as keys) to securely transmit traffic (e.g., packets) to and/or from endpoint devices. The MACsec protocol may be referred to as the MACsec key agreement (MKA) protocol.

SUMMARY

Some implementations described herein relate to a method. The method may include installing, on a first network device, a new receive encryption key, and starting a first timer associated with deleting an old receive encryption key. The method may include providing, to a second network device, a first message identifying the new receive encryption key, and determining whether packet counts, successfully decrypted/authenticated with the old receive encryption key, have changed. The method may include determining whether the first timer has expired based on the packet counts, successfully decrypted/authenticated with the old receive encryption key, not changing, and determining whether the new receive encryption key has successfully decrypted/authenticated a packet based on the first timer expiring. The method may include deleting the old receive encryption key from the first network device based on the new receive encryption key successfully decrypting/authenticating a packet. The first timer may be reset if still receiving valid data to allow a buffer after the last valid packet is received to cover intermittent traffic scenario.

Some implementations described herein relate to a first network device. The first network device may include one or more memories and one or more processors. The one or more processors may be configured to install, on the first network device, a new receive encryption key, and start a first timer associated with deleting an old receive encryption key. The one or more processors may be configured to provide, to a second network device, a first message identifying the new receive encryption key, and determine whether packet counts, successfully decrypted/authenticated with the old receive encryption key, have changed. The one or more processors may be configured to determine whether the first timer has expired based on the packet counts, successfully decrypted/authenticated with the old receive encryption key, not changing, and determine whether the new receive encryption key has successfully decrypted/authenticated a packet based on the first timer expiring. The one or more processors may be configured to delete the old receive encryption key from the first network device based on the new receive encryption key successfully decrypting/authenticating a packet, and receive, from the second network device, a first acknowledgement message indicating installation of the new receive encryption key by the second network device. The one or more processors may be configured to install, on the first network device, a new transmit encryption key based on the first acknowledgement message.

Some implementations described herein relate to a non-transitory computer-readable medium that stores a set of instructions. The set of instructions, when executed by one or more processors of a first network device, may cause the first network device to install, on the first network device, a new receive encryption key, and store the new receive encryption key in a hardware memory register of the first network device after installing the new receive encryption key. The set of instructions, when executed by one or more processors of the first network device, may cause the first network device to start a first timer associated with deleting an old receive encryption key, and provide, to a second network device, a first message identifying the new receive encryption key. The set of instructions, when executed by one or more processors of the first network device, may cause the first network device to determine whether packet counts, successfully decrypted/authenticated with the old receive encryption key, have changed, and determine whether the first timer has expired based on the packet counts, successfully decrypted/authenticated with the old receive encryption key, not changing. The set of instructions, when executed by one or more processors of the first network device, may cause the first network device to determine whether the new receive encryption key has successfully decrypted/authenticated a packet based on the first timer expiring, and delete the old receive encryption key from the first network device based on the new receive encryption key successfully decrypted/authenticating a packet. The set of instructions, when executed by one or more processors of the first network device, may cause the first network device to receive, from the second network device, a first acknowledgement message indicating installation of the new receive encryption key by the second network device, and install, on the first network device, a new transmit encryption key based on the first acknowledgement message.

DETAILED DESCRIPTION

Figure 1A:
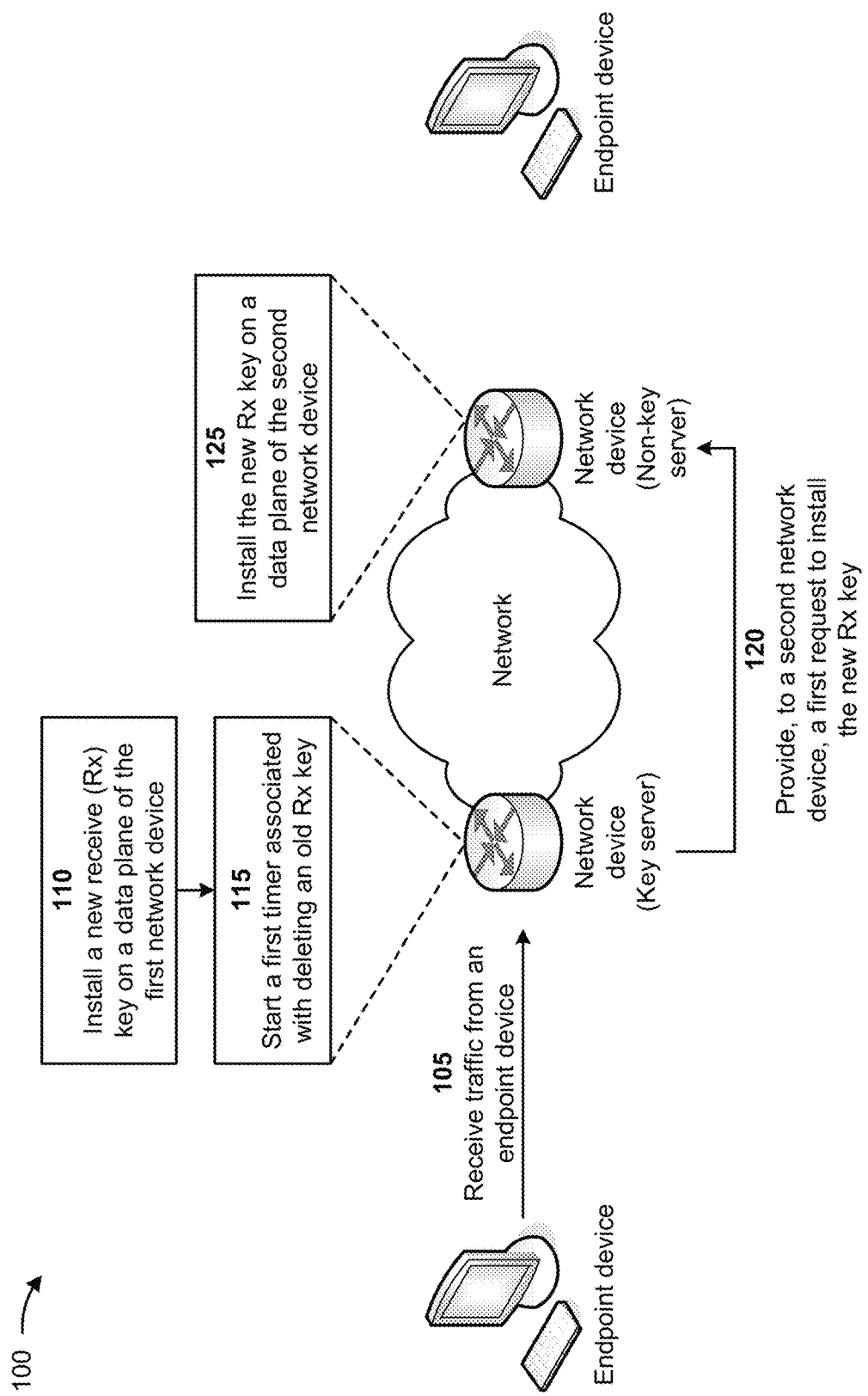
FIGS. 1A-1J are diagrams of an example associated with detecting and removing inactive encryption keys during encryption key rollover events.

The following detailed description of example implementations refers to the accompanying drawings. The same reference numbers in different drawings may identify the same or similar elements.

Key rollover is the process of generating and using a new key (e.g., a symmetric or an asymmetric key pair) to replace a key already in use. Key rollover may be performed because an old key has been compromised or is vulnerable to compromise as a result of use and age. In order to achieve hitless key rollover (e.g., switching to a new pair of transmit (Tx)/receive (Rx) keys with zero packet loss during key rollover), the Rx keys are installed on all network devices first (e.g., key server network device and non-key server network devices) followed by installation of the Tx keys. In other words, a new Rx key is installed on a key server network device, and then the new Rx key is installed on peer network devices. A new Tx key is installed on the key server network device, and then the new Tx key is installed on the peer network devices. This sequence will ensure that all network devices in a network are ready to receive traffic before the key server network device transmits traffic using the new Tx key.

The Tx/Rx keys are stored in hardware memory registers of a chip (e.g., an application-specific integrated circuit (ASIC) of a network device) that implements the MACsec feature. For a key rollover to be hitless, a current Rx key is kept stored in the hardware memory registers while a new Rx key is being installed on the network device. This ensures that the network device is able to receive and decrypt traffic transmitted by peer network devices using an old Tx key until a new Tx key is installed on the peer network devices. However, since the hardware memory registers are a limited resource, the network device cannot continue to store all previous Rx keys while key rollover events occur since the network device will eventually expend the hardware memory registers and cause a protocol function failure.

Furthermore, there may be many MACsec sessions per port of a network device, and querying MACsec statistics for each MACsec session on active and no longer active keys every second depletes resources of the network device. Resource usage may be optimized if only MACsec statistics are queried for currently active keys, and keys that are no longer processing MACsec traffic are removed. However, there is no current mechanism to deallocate the Rx/Tx keys from a data plane of a network device. Thus, the data plane continues to use resources to carry traffic and query MACsec statistics from hardware for all keys.

Thus, current techniques for achieving hitless key rollover consume computing resources (e.g., processing resources, memory resources, communication resources, and/or the like), networking resources, and/or the like, associated with expending hardware memory registers of network devices caused by storing previous Rx keys, losing traffic based on the expended hardware registers, attempting to recover the lost traffic, providing unsecure traffic over a network, and/or the like.

Some implementations described herein relate to a network device that detects and removes inactive encryption keys during encryption key rollover events. For example, a network device may install, on the network device, a new receive encryption key, and may store the new receive encryption key in a hardware memory register of the network device after installing the new receive encryption key. The network device may start a timer associated with deleting an old receive encryption key, and may provide, to another network device, a message identifying the new receive encryption key. The network device may determine whether packet counts, successfully decrypted/authenticated with the old receive encryption key, have changed, and may determine whether the timer has expired based on the packet counts, with the old receive encryption key, not changing. The network device may determine whether the new receive encryption key has successfully decrypted/authenticated a packet based on the timer expiring, and may delete the old receive encryption key from the network device based on the new receive encryption key successfully decrypted/authenticating a packet. A secondary timer may be utilized in case there is no traffic on a new link. The network device may receive, from the other network device, an acknowledgement message indicating installation of the new receive encryption key by the other network device, and may install, on the network device, a new transmit encryption key based on the acknowledgement message.

In this way, the network device detects and removes inactive encryption keys during encryption key rollover events. For example, on a MACsec session startup, one Tx key and one Rx key create request is sent to the data plane of the network device. On Rx key rollover, the network device may create a new Rx key in the data plane as requested from the control plane. In the data plane, the network device may start a timer associated with an old Rx key, and may periodically determine whether any packets are successfully decrypted/authenticated with the old Rx key. When timer reaches a predetermined threshold (e.g., in seconds), and no packets are successfully decrypted/authenticated with the old Rx key, the network device may determine whether any packets are successfully decrypted/authenticated with the new Rx key. If any packets are successfully decrypted/authenticated with the new Rx key, the network device may determine that the old Rx key is no longer being utilized, and may safely delete the old Rx key without impacting traffic. The network device may perform a similar process for creation of a new Tx key. Thus, the network device conserves computing resources, networking resources, and/or the like that would otherwise have been consumed by expending hardware memory registers of network devices caused by storing previous Rx keys, losing traffic based on the expended hardware registers, attempting to recover the lost traffic, providing unsecure traffic over a network, and/or the like. In some implementations, the functionality described herein may be performed independently of a control plane (e.g., an with the data plane), may be performed with the control plane, and/or the like.

FIGS. 1A-1J are diagrams of an example 100 associated with detecting and removing inactive encryption keys during encryption key rollover events. As shown in FIGS. 1A-1J, example 100 includes one or more endpoint devices and a network with a plurality of network devices. Further details of the endpoint devices, the network, and the network devices are provided elsewhere herein.

As shown in FIG. 1A, and by reference number 105, a first network device (e.g., a key server network device) may receive traffic from an endpoint device. For example, the endpoint device may continuously generate the traffic, may periodically generate the traffic, and/or the like, and may provide the traffic to the network device. Thus, the first network device may continuously receive the traffic from the endpoint device, may periodically receive the traffic from the endpoint device, may receive the traffic from the endpoint device based on requesting the traffic from the endpoint device, and/or the like.

As further shown in FIG. 1A, and by reference number 110, the first network device may install a new receive (Rx) key on a data plane of the first network device. For example, the first network device may be a key server and the second network device may be a peer or non-key server. A pair of old MACsec keys (e.g., an old Rx key and an old Tx key) may be installed on the first network device and the second network device. The first network device may be configured to install a pair of new MACsec keys (e.g., the new Rx key and a new Tx key). The first network device may include software (e.g., a daemon) that causes the first network device to install the new Rx key on the data plane of the first network device. In some implementations, the daemon of the first network device may cause the first network device to store the new Rx key in hardware memory registers of a chip (e.g., an ASIC of the first network device) that implements the MACsec feature.

In some implementations, the pair of new MACsec keys may be preconfigured on the first network device, may be automatically generated by the first network device, may be received from another device (e.g., a network administrative device), and/or the like. In some implementations, the first network device may cause another device to generate the pair of new MACsec keys. The first network may be triggered to replace the pair of old MACsec keys with the pair of new MACsec keys based on, for example, a last time the key pair was updated, receiving, from another device (e.g., a network administrative device), an indication to update the key pair, after a predetermined time period, and/or the like.

As further shown in FIG. 1A, and by reference number 115, the first network device may start a first timer associated with deleting an old Rx key from the first network device. For example, since the new Rx key is installed on the first network device, the old Rx key may be deleted from the data plane of the first network device. This will ensure that the first network device does not unnecessarily expend resources querying the old Rx key. In some implementations, the first network device may initiate a first timer associated with deletion of the old Rx key from the first network device. The first timer may be utilized to determine a time when the old Rx key may be deleted from the first network device.

As further shown in FIG. 1A, and by reference number 120, the first network device may provide, to a second network device, a first request to install the new Rx key. For example, the daemon of the first network device may cause the first network device to generate the first request to install the new Rx key. In some implementations, the first request may include a MACsec key agreement (MKA) control message exchanged between the daemon of the first network device and daemons executing on peer network devices, such as the second network device. The first request may include the new Rx key and instructions requesting the second network device to install the new Rx key on a data plane of the second network device. The first network device may provide the first request to the second network device, and the second network device may receive the first request.

As further shown in FIG. 1A, and by reference number 125, the second network device may install the new Rx key on a data plane of the second network device. For example, the second network device may receive the first request to install the new Rx key (e.g., which includes the new Rx key), and may install the new Rx key on the data plane of the second network device based on the first request. In some implementations, the second network device may include software (e.g., a daemon) that causes the second network device to install the new Rx key on the data plane of the second network device based on the first request. In some implementations, the daemon of the second network device may cause the second network device to store the new Rx key in hardware memory registers of a chip (e.g., an ASIC of the second network device) that implements the MACsec feature.

Figure 1B:
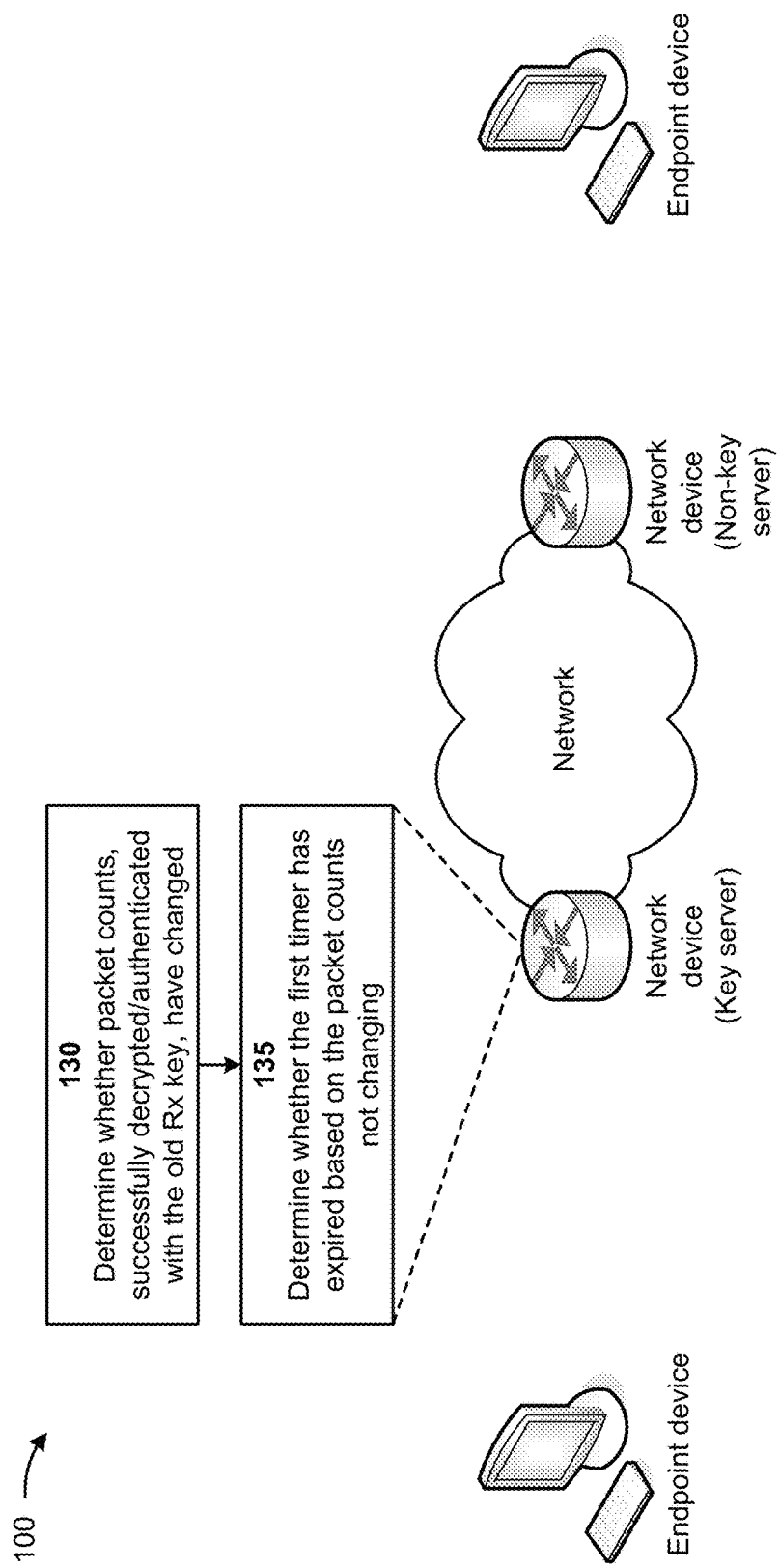

As shown in FIG. 1B, and by reference number 130, the first network device may determine whether packet counts, successfully decrypted/authenticated with the old Rx key, have changed. For example, the old Rx key may be utilized by the first network device to decrypt packets (e.g., traffic) received by the first network device. The first network device may determine a first packet count associated with packets that are successfully decrypted/authenticated with the old Rx key when the first timer is started. The first network device may determine a second packet count associated with packets that are successfully decrypted/authenticated with the old Rx key a predetermined time period (e.g., in seconds) after the first timer is started. The first network device may determine whether the first packet count is different than the second packet count. In some implementations, if the first packet count is different than the second packet count, the first network device may determine that the packet counts, successfully decrypted/authenticated with the old Rx key, have changed. Alternatively, if the first packet count and the second packet count are equivalent, the first network device may determine that the packet counts, successfully decrypted/authenticated with the old Rx key, have not changed.

As further shown in FIG. 1B, and by reference number 135, the first network device may determine whether the first timer has expired based on the packet counts, successfully decrypted/authenticated with the old Rx key, not changing. For example, if the first network device determines that the packet counts, successfully decrypted/authenticated with the old Rx key, have not changed, the first network device may determine whether the first timer has expired. In some implementations, the first network device may determine that the first timer has expired when the first timer reaches a predetermined threshold (e.g., in seconds, such as six to ten seconds). Alternatively, the first network device may determine that the first timer has not expired when the first timer has not reached the predetermined threshold.

Figure 1C:
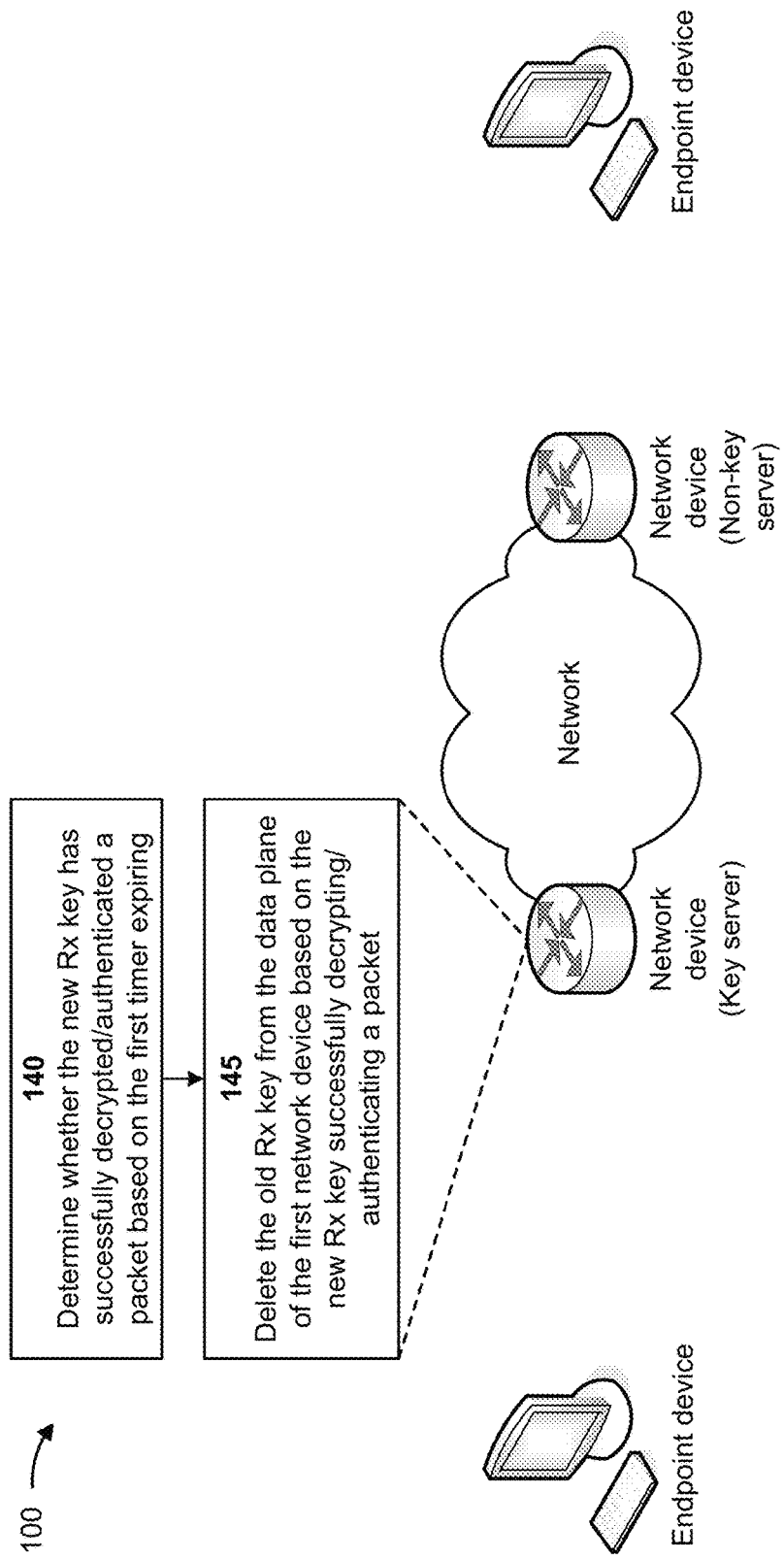

As shown in FIG. 1C, and by reference number 140, the first network device may determine whether the new Rx key has successfully decrypted/authenticated a packet based on the first timer expiring. For example, if the first network device determines that the first timer has expired based on the first timer reaching the predetermined threshold, the first network device may determine whether the new Rx key (e.g., installed in the data plane of the first network device) has been utilized to successfully decrypt a packet. In some implementations, the first network device may determine that the new Rx key has been utilized to successfully decrypt a packet. Alternatively, the first network device may determine that the new Rx key has not been utilized to successfully decrypt a packet.

As further shown in FIG. 1C, and by reference number 145, the first network device may delete the old Rx key from the data plane of the first network device based on the new Rx key successfully decrypted/authenticating a packet. For example, if the first network device determines that the new Rx key has been utilized to successfully decrypt a packet, the daemon of the first network device may cause the first network device to delete the old Rx key from the data plane of the first network device. In some implementations, the daemon of the first network device may cause the first network device to remove the old Rx key from the hardware memory registers of the chip (e.g., the ASIC of the first network device) that implements the MACsec feature. In some implementations, the daemon of the first network device may cause a control plane of the first network device to provide a deletion request to the data plane of the first network device, and may cause the data plane of the first network device to delete the old Rx key based on the deletion request.

Figure 1D:
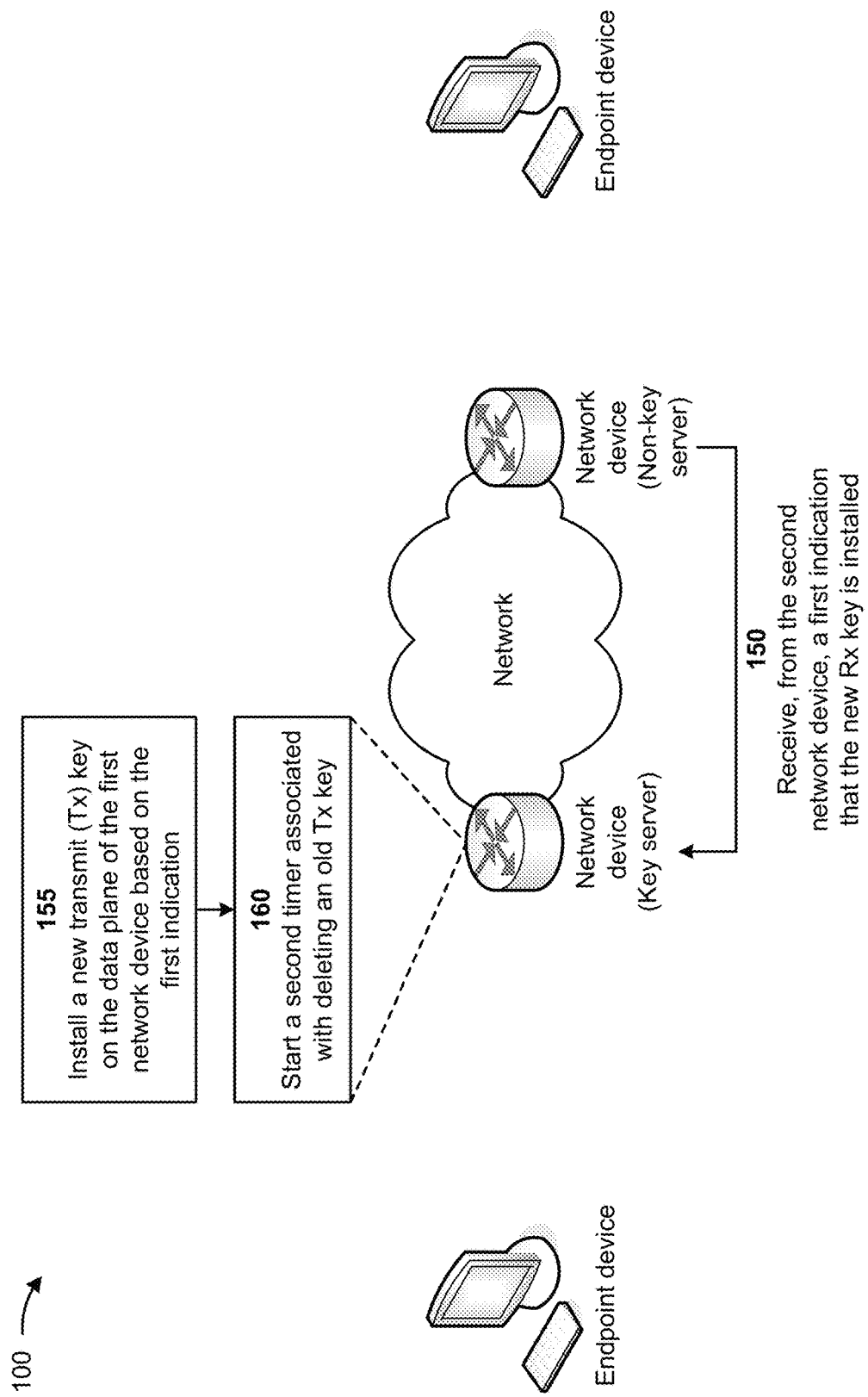

As shown in FIG. 1D, and by reference number 150, the first network device may receive, from the second network device, a first indication that the new Rx key is installed. For example, after installing the new Rx key on the data plane, the daemon of the second network device may cause the second network device to generate the first indication indicating that the new Rx key is installed on the data plane of the second network device. In some implementations, the first indication may include an MKA control message exchanged between the daemon on the second network device and the daemon of the first network device. The first indication may include information indicating that the second network device installed the new Rx key on a data plane of the second network device. The second network device may provide the first indication to the first network device, and the first network device may receive the first indication.

As further shown in FIG. 1D, and by reference number 155, the first network device may install a new transmit (Tx) key on the data plane of the first network device based on the first indication. For example, after receiving the first indication, the first network device may install the new Tx key on the data plane of the first network device. In some implementations, the daemon of the first network device may cause the first network device to install the new Tx key on the data plane of the first network device. In some implementations, the daemon of the first network device may cause the first network device to store the new Tx key in the hardware memory registers of the chip (e.g., the ASIC of the first network device) that implements the MACsec feature.

As further shown in FIG. 1D, and by reference number 160, the first network device may start a second timer associated with deleting an old Tx key. For example, since the new Tx key is installed on the first network device, the old Tx key may be deleted from the data plane of the first network device. This will ensure that the first network device does not unnecessarily expend resources querying the old Tx key. In some implementations, the first network device may initiate a second timer (e.g., different than the first timer) associated with deletion of the old Tx key from the first network device. The second timer may be utilized to determine a time when the old Tx key may be deleted from the first network device.

Figure 1E:
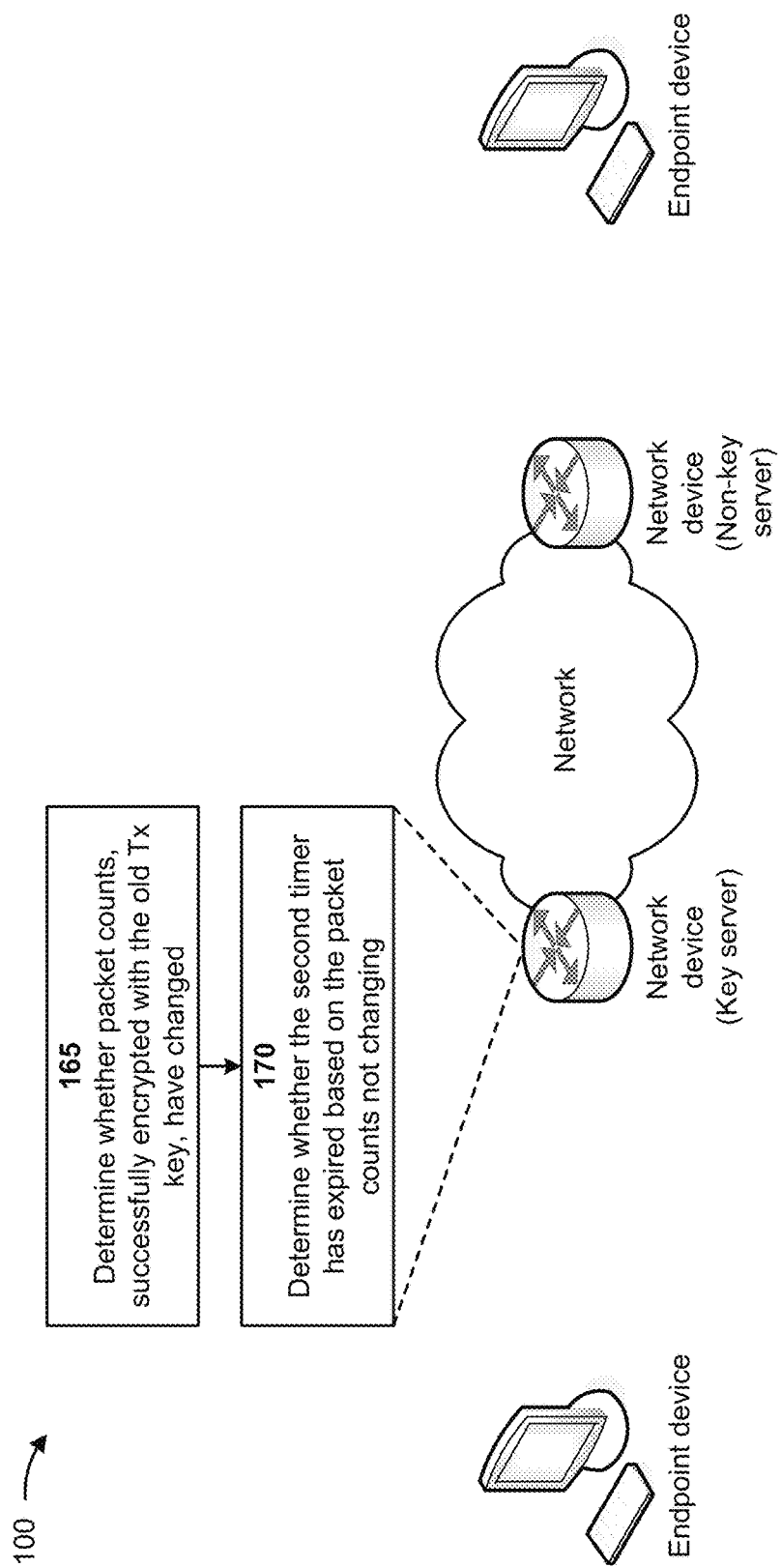

As shown in FIG. 1E, and by reference number 165, the first network device may determine whether packet counts, successfully encrypted with the old Tx key, have changed. For example, the old Tx key may be utilized by the first network device to encrypt packets (e.g., traffic) sent by the first network device. The first network device may determine a first packet count associated with packets that are successfully encrypted with the old Tx key when the second timer is started. The first network device may determine a second packet count associated with packets that are successfully encrypted with the old Tx key a predetermined time period (e.g., in seconds) after the second timer is started. The first network device may determine whether the first packet count is different than the second packet count. In some implementations, if the first packet count is different than the second packet count, the first network device may determine that the packet counts, successfully encrypted with the old Tx key, have changed. Alternatively, if the first packet count and the second packet count are equivalent, the first network device may determine that the packet counts, successfully encrypted with the old Tx key, have not changed.

As further shown in FIG. 1E, and by reference number 170, the first network device may determine whether the second timer has expired based on the packet counts, successfully encrypted with the old Tx key, not changing. For example, if the first network device determines that the packet counts, successfully encrypted with the old Tx key, have not changed, the first network device may determine whether the second timer has expired. In some implementations, the first network device may determine that the second timer has expired when the second timer reaches a predetermined threshold (e.g., in seconds, such as six to ten seconds). Alternatively, the first network device may determine that the second timer has not expired when the second timer has not reached the predetermined threshold.

Figure 1F:
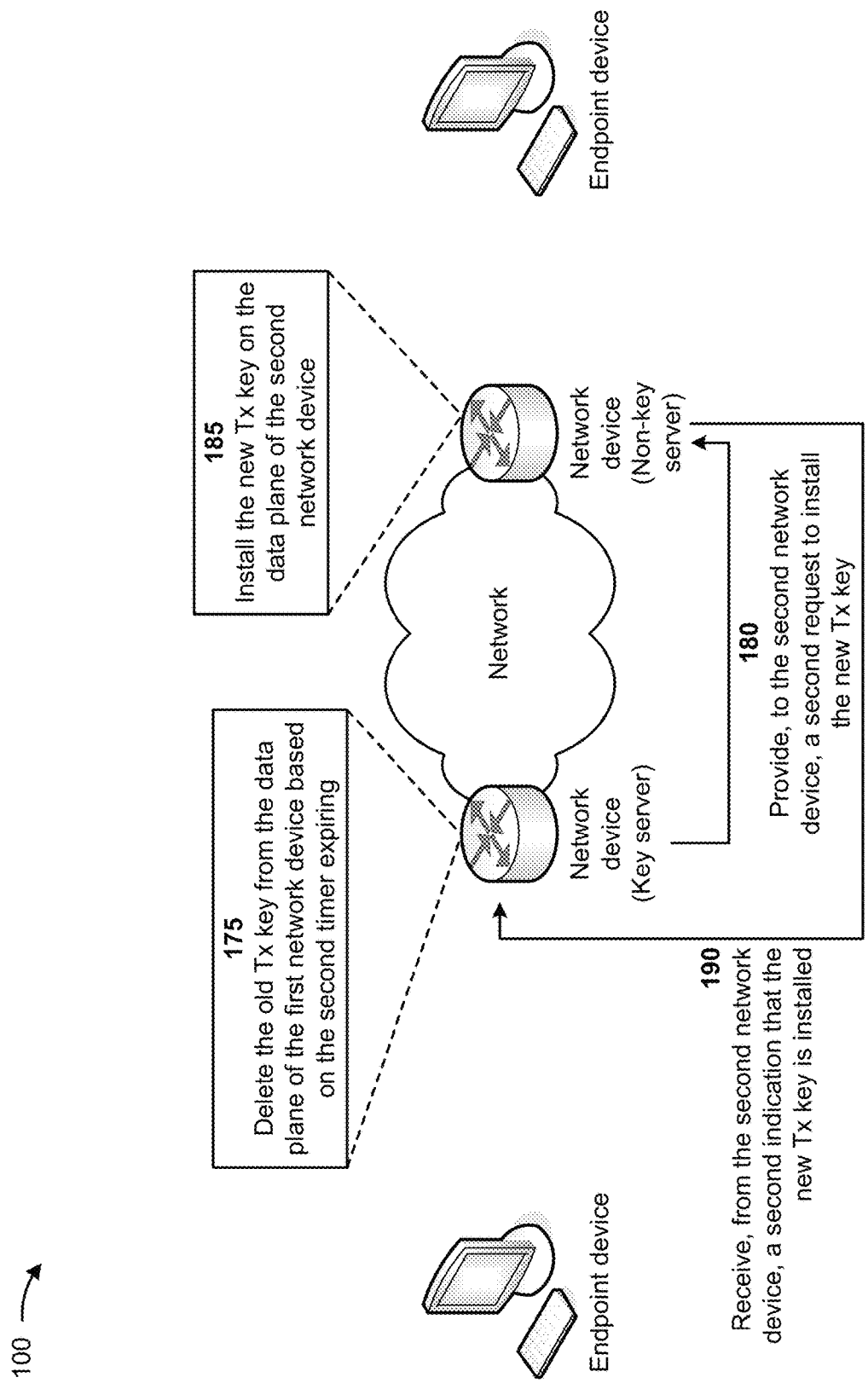

As shown in FIG. 1F, and by reference number 175, the first network device may delete the old Tx key from the data plane of the first network device based on the second timer expiring. For example, if the first network device determines that the second timer has expired, the daemon of the first network device may cause the first network device to delete the old Tx key from the data plane of the first network device. In some implementations, the daemon of the first network device may cause the first network device to remove the old Tx key from the hardware memory registers of the chip (e.g., the ASIC of the first network device) that implements the MACsec feature. In some implementations, the daemon of the first network device may cause a control plane of the first network device to provide a deletion request to the data plane of the first network device, and may cause the data plane of the first network device to delete the old Tx key based on the deletion request.

As further shown in FIG. 1F, and by reference number 180, the first network device may provide, to the second network device, a second request to install the new Tx key. For example, the daemon of the first network device may cause the first network device to generate the second request to install the new Tx key. In some implementations, the second request may include an MKA control message exchanged between the daemon on the first network device and daemons executing on peers network devices, such as the second network device. The second request may include the new Tx key and instructions requesting the second network device to install the new Tx key on the data plane of the second network device. The first network device may provide the second request to the second network device, and the second network device may receive the second request.

As further shown in FIG. 1F, and by reference number 185, the second network device may install the new Tx key on the data plane of the second network device. For example, the second network device may receive the second request to install the new Tx key (e.g., which includes the new Tx key), and may install the new Tx key on the data plane of the second network device based on the second request. In some implementations, the daemon of the second network device may cause the second network device to install the new Tx key on the data plane of the second network device based on the second request. In some implementations, the daemon of the second network device may cause the second network device to store the new Tx key in the hardware memory registers of the chip (e.g., the ASIC of the second network device) that implements the MACsec feature.

As further shown in FIG. 1F, and by reference number 190, the first network device may receive, from the second network device, a second indication that the new Tx key is installed. For example, after installing the new Tx key on the data plane, the daemon of the second network device may cause the second network device to generate the second indication that the new Tx key is installed. In some implementations, the second indication may include an MKA control message exchanged between the daemon on the second network device and the daemon of the first network device. The second indication may include information indicating that the new Tx key is installed on the data plane of the second network device. The second network device may provide the second indication to the first network device, and the first network device may receive the second indication.

Figure 1G:
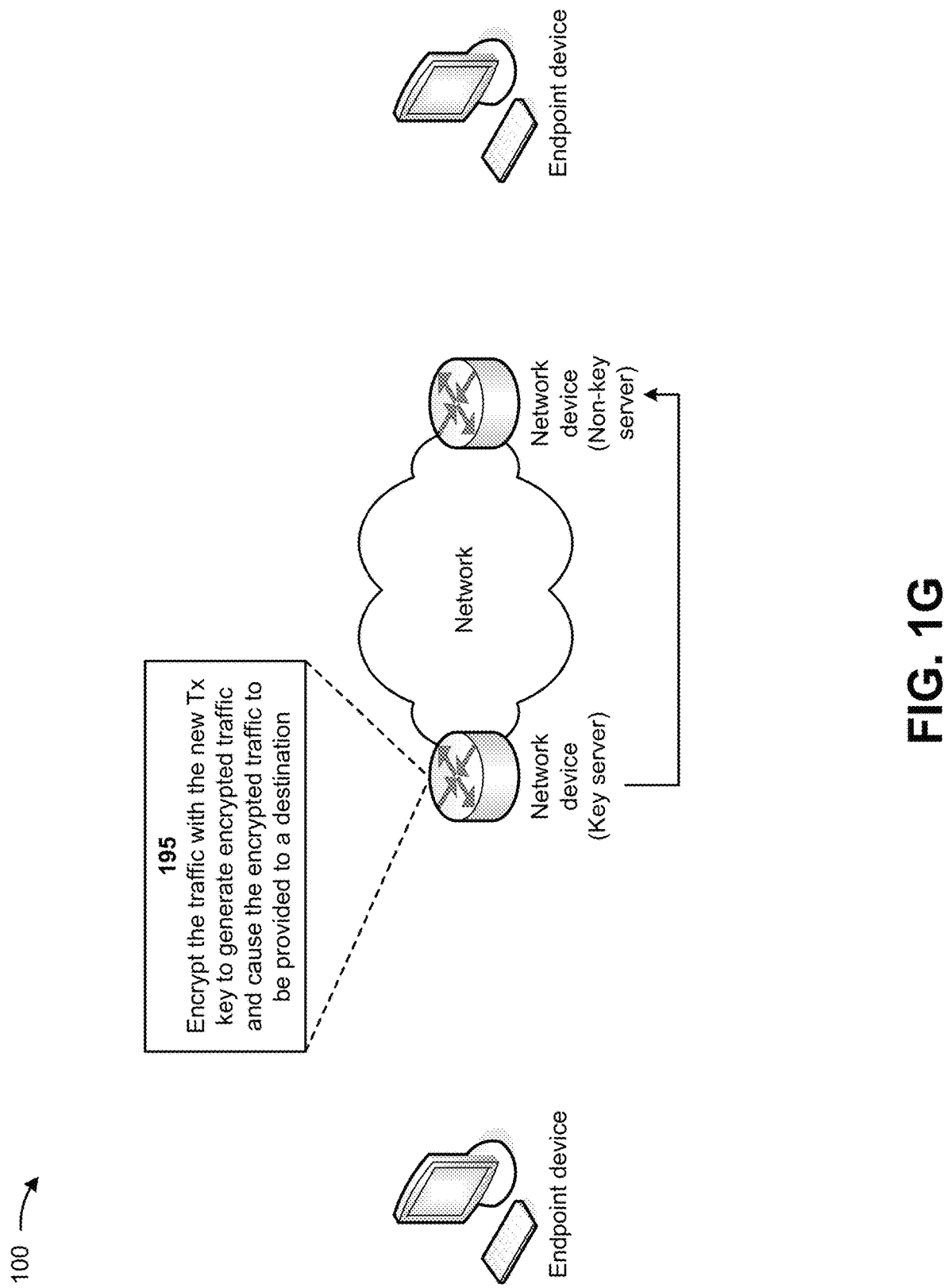

As shown in FIG. 1G, and by reference number 195, the first network device may encrypt the traffic with the new Tx key to generate encrypted traffic and may cause the encrypted traffic to be provided to a destination. For example, once the key rollover is complete, the first network device may utilize the new Tx key to encrypt the traffic and to generate the encrypted traffic. In some implementations, the first network device may generate a symmetric key intended for symmetric key cryptography, and may utilize the new Tx key to encrypt the newly generated symmetric key and the traffic. The first network device may send the encrypted symmetric key and the encrypted traffic over an insecure channel to the destination, via the second network device. The second network device may decrypt the encrypted symmetric key and the encrypted traffic using the new Rx key (e.g., which pairs with the new Tx key). With the first network device and the second network device both having the same symmetric key, the first network device and the second network device may safely utilize symmetric key encryption to communicate over otherwise-insecure channels.

In some implementations, the first network device may provide the encrypted traffic to the second network device. The second network device may utilize the new Rx key to decrypt the encrypted traffic and to generate the traffic. If the second network device is connected to the destination (e.g., an endpoint device), the second network device may forward the traffic to the destination. If the second network device is not connected to the destination, the second network device may provide the encrypted traffic to another peer network device that includes the new Rx key for decrypting the encrypted traffic.

Implementations are described herein with respect to the first network device utilizing timers and other functionality to delete the old Rx key and the old Tx key from the data plane of the first network device. In some implementations, the second network device may utilize the same or similar timers and other functionality to delete the old Rx key and the old Tx key from the data plane of the second network device.

In some implementations, the functionality of the first network device may be applied to multiple outstanding keys such as the case where key rollover a few times within a short period of time. For example, there may be three or four outstanding keys in the Rx direction, and a new Rx key will still be the latest key. In some implementations, in the Rx direction, packets may be associated with authenticated (validated) only packet counts or byte counts and/or decrypted (which is authenticated) packet counts or byte counts. In the Tx direction, packets may be associated with protected packet counts (e.g., for authentication only, packets are not encrypted) or byte counts and/or encrypted packet counts (e.g., for packets that are encrypted as well as protected) or byte counts. For example, the first network device may determine whether there are successfully encrypted transmitted packet counts (e.g., encrypted packets and/or protected packets), whether there are successfully decrypted received packet counts (e.g., accepted packets, validated packets, and/or decrypted packets), and/or the like.

Figure 1H:
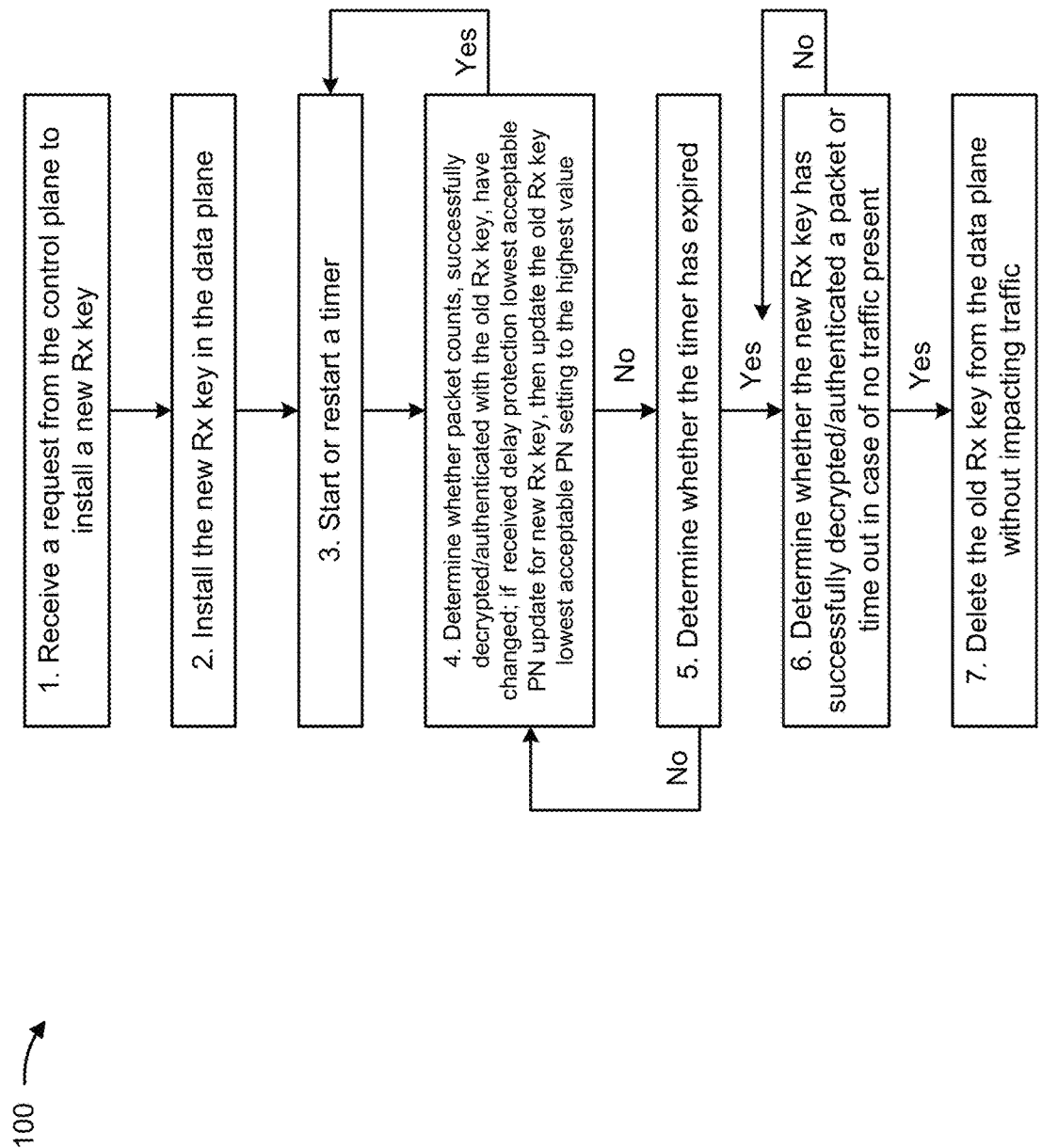

FIG. 1H depicts steps of a process performed by the first network device when installing a new Rx key on the first network device and when deleting an old Rx key from the first network device. As shown at step 1 of FIG. 1H, the first network device may receive a request, from the control plane of the first network device, to install the new Rx key in the data plane of the first network device. As shown at step 2, the first network device may install the new Rx key in the data plane of the first network device. As shown at steps 3 and 4, the first network device may start a timer associated with deleting the old Rx key, and may determine whether packet counts, successfully decrypted/authenticated with the old Rx key, have changed.

As further shown at step 4 of FIG. 1H, if the first network device determines that packet counts, successfully decrypted/authenticated with the old Rx key, have changed, the first network device may restart the timer. As further shown at step 4 and at step 5, if the first network device determines that packet counts, successfully decrypted/authenticated with the old Rx key, have not changed, the first network device may determine whether the timer has expired. As further shown at step 5, if the first network device determines that the timer has not expired, the first network device may once again determine whether packet counts, successfully decrypted/authenticated with the old Rx key, have changed. As further shown at step 5 and at step 6, if the first network device determines that the timer has expired, the first network device may determine whether the new Rx key has successfully decrypted/authenticated a packet or time out in case of no traffic present.

As further shown at step 6 of FIG. 1H, if the first network device determines that the new Rx key has not successfully decrypted/authenticated a packet, the first network device may determine whether the timer has expired. As further shown at step 6 and at step 7, if the first network device determines that the new Rx key has successfully decrypted/authenticated a packet, the first network device may delete the old Rx key from the data plane of the first network device, without impacting traffic.

Figure 1I:
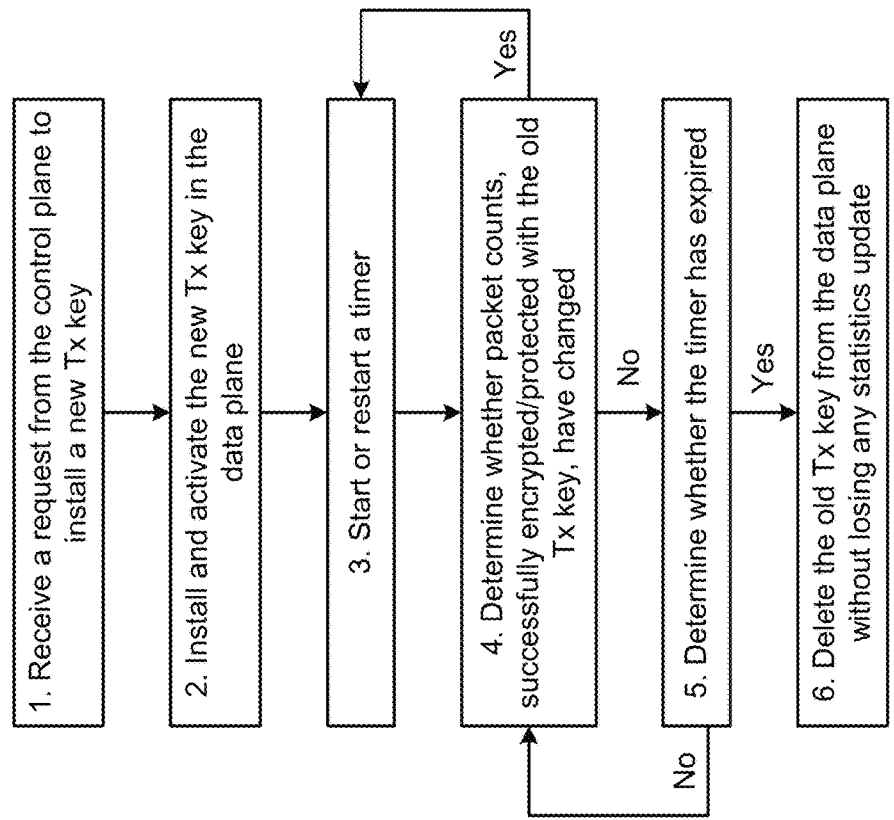

FIG. 1I depicts steps of a process performed by the first network device when installing a new Tx key on the first network device and when deleting an old Tx key from the first network device. As shown at step 1 of FIG. 1I, the first network device may receive a request, from the control plane of the first network device, to install the new Tx key in the data plane of the first network device. As shown at step 2, the first network device may install and activate the new Tx key in the data plane of the first network device (e.g., so that traffic is transmitted using the new Tx key). As shown at steps 3 and 4, the first network device may start a timer associated with deleting the old Tx key, and may determine whether packet counts, successfully encrypted/protected with the old Tx key, have changed.

As further shown at step 4 of FIG. 1I, if the first network device determines that packet counts, successfully encrypted/protected with the old Tx key, have changed, the first network device may restart the timer. As further shown at step 4 and at step 5, if the first network device determines that packet counts, successfully encrypted/protected with the old Tx key, have not changed, the first network device may determine whether the timer has expired. As further shown at step 5, if the first network device determines that the timer has not expired, the first network device may once again determine whether packet counts, successfully encrypted/protected with the old Tx key, have changed. As further shown at step 5 and at step 6, if the first network device determines that the timer has expired, the first network device may delete the old Tx key from the data plane of the first network device, without losing any Tx statistic updates from hardware.

Figure 1J:
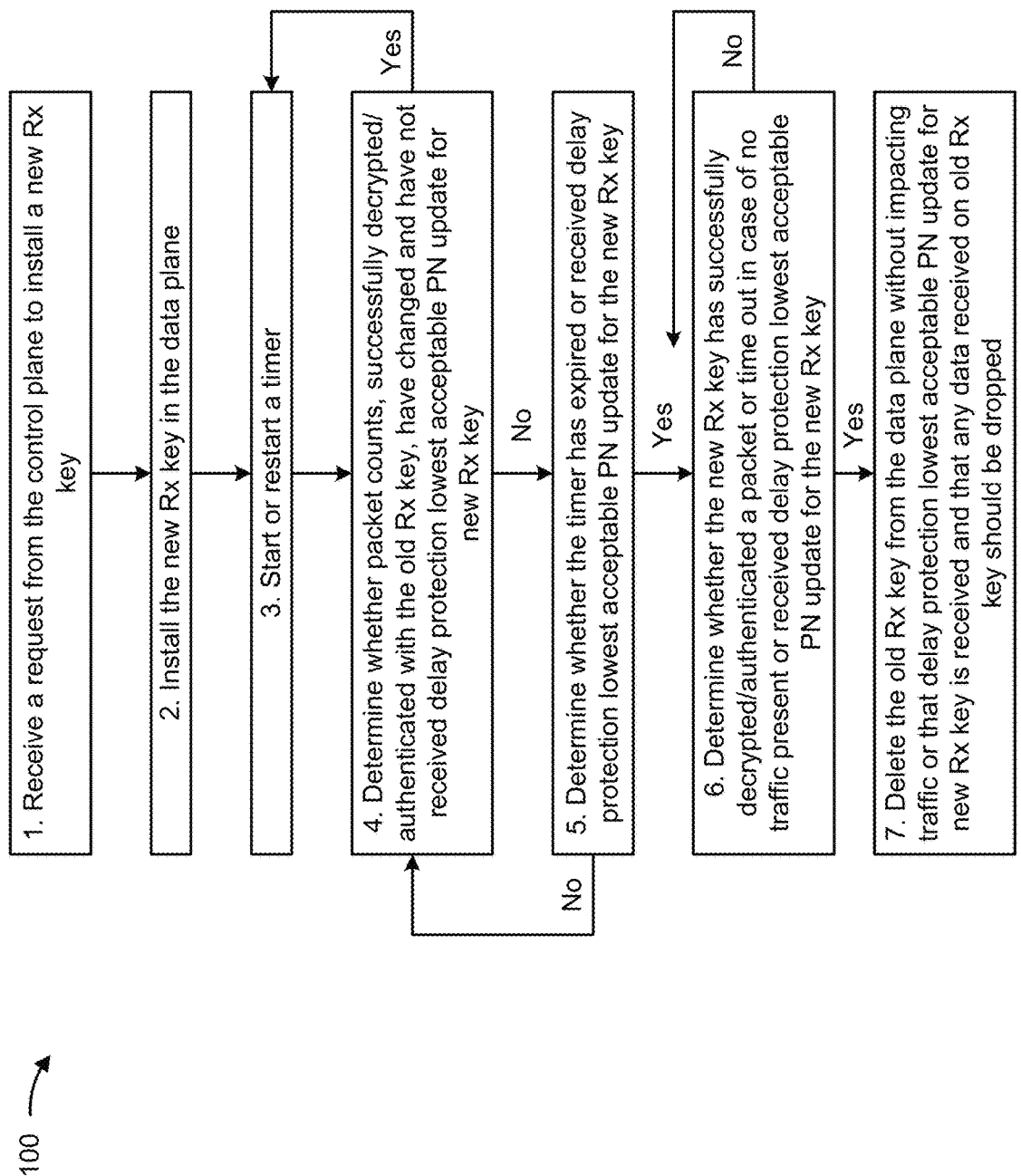

FIG. 1J depicts steps of a process performed by the first network device when installing a new Rx key on the first network device, with delay protection and when deleting an old Rx key from the first network device. As shown at step 1 of FIG. 1J, the first network device may receive a request, from the control plane of the first network device, to install the new Rx key in the data plane of the first network device. As shown at step 2, the first network device may install the new Rx key in the data plane of the first network device. As shown at steps 3 and 4, the first network device may start a timer associated with deleting the old Rx key, and may determine whether packet counts, successfully decrypted/authenticated with the old Rx key, have changed and have not received delay protection lowest acceptable PN update for the new Rx key.

As further shown at step 4 of FIG. 1J, if the first network device determines that packet counts, successfully decrypted/authenticated with the old Rx key, have changed and have not received delay protection lowest acceptable PN update for the new Rx key, the first network device may restart the timer. As further shown at step 4 and at step 5, if the first network device determines that packet counts, successfully decrypted/authenticated with the old Rx key, have not changed or have received delay protection lowest acceptable PN update for the new Rx key, the first network device may determine whether the timer has expired or have received delay protection lowest acceptable PN update for the new Rx key. As further shown at step 5, if the first network device determines that the timer has not expired or have not received delay protection lowest acceptable PN update for the new Rx key, the first network device may once again determine whether packet counts, successfully decrypted/authenticated with the old Rx key, have changed and have not received delay protection lowest acceptable PN update for the new Rx key. As further shown at step 5 and at step 6, if the first network device determines that the timer has expired or have received delay protection lowest acceptable PN update for the new Rx key, the first network device may determine whether the new Rx key has successfully decrypted/authenticated a packet or a time out in case no traffic present or have received delay protection lowest acceptable PN update for the new Rx key.

As further shown at step 6 of FIG. 1J, if the first network device determines that the new Rx key has not successfully decrypted/authenticated a packet or no time out in case no traffic present or not have received delay protection lowest acceptable PN update for the new Rx key, the first network device may determine whether the timer has expired. As further shown at step 6 and at step 7, if the first network device determines that the new Rx key has successfully decrypted/authenticated a packet or a time out in case no traffic present or have received delay protection lowest acceptable PN update for the new Rx key, then first network device may delete the old Rx key from the data plane of the first network device, without impacting traffic or that delay protection lowest acceptable PN update for new key is received and that any data received on the old Rx key should be dropped.

In this way, the network device detects and removes inactive encryption keys during encryption key rollover events. For example, on a MACsec session startup, one Tx key and one Rx key create request is sent to the data plane of the network device. On Rx key rollover, the network device may create a new Rx key in the data plane as requested from the control plane. In the data plane, the network device may start a timer associated with an old Rx key, and may periodically determine whether any packets are successfully decrypted/authenticated with the old Rx key. When timer reaches a predetermined threshold (e.g., in seconds), and no packets are successfully decrypted/authenticated with the old Rx key, the network device may determine whether any packets are successfully decrypted/authenticated with the new Rx key. If any packets are successfully decrypted/authenticated with the new Rx key, the network device may determine that the old Rx key is no longer being utilized, and may safely delete the old Rx key without impacting traffic. The network device may perform a similar process for creation of a new Tx key. Thus, the network device conserves computing resources, networking resources, and/or the like that would otherwise have been consumed by expending hardware memory registers of network devices caused by storing previous Rx keys, losing traffic based on the expended hardware registers, attempting to recover the lost traffic, providing unsecure traffic over a network, and/or the like.

As indicated above, FIGS. 1A-1J are provided as an example. Other examples may differ from what is described with regard to FIGS. 1A-1J. The number and arrangement of devices shown in FIGS. 1A-1J are provided as an example. In practice, there may be additional devices, fewer devices, different devices, or differently arranged devices than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) shown in FIGS. 1A-1J may perform one or more functions described as being performed by another set of devices shown in FIGS. 1A-1J.

Figure 2:
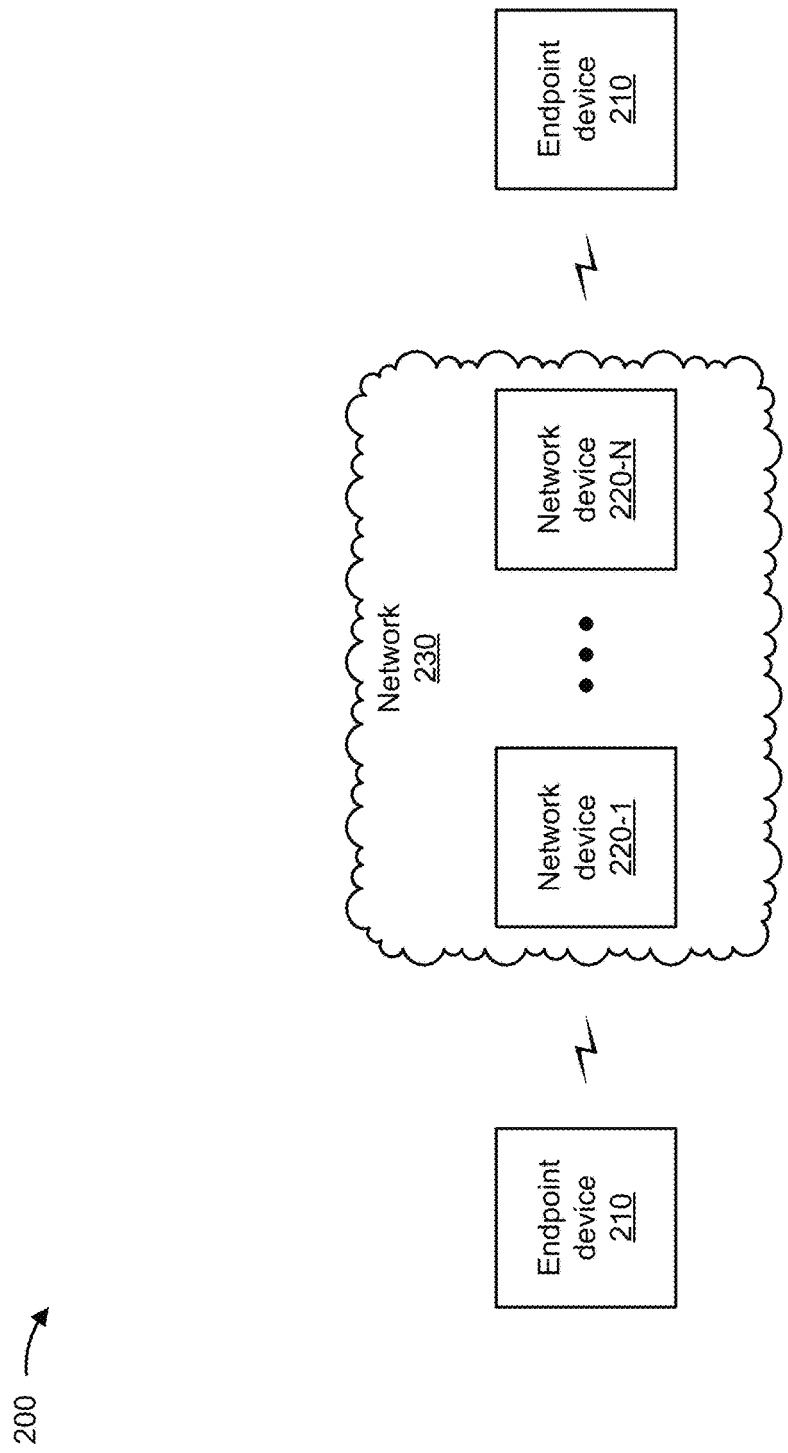
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include endpoint devices 210, a group of network devices 220 (shown as network device 220-1 through network device 220-N), and a network 230. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a set-top box, a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device (e.g., a router, a residential gateway, and/or the like), or a similar type of device. In some implementations, the endpoint device 210 may receive network traffic from and/or may provide network traffic to other endpoint devices 210, via the network 230 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 230.

The network 230 includes one or more wired and/or wireless networks. For example, the network 230 may include a packet switched network, a cellular network (e.g., a fifth generation (5G) network, a fourth generation (4G) network, such as a long-term evolution (LTE) network, and/or a third generation (3G) network), a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
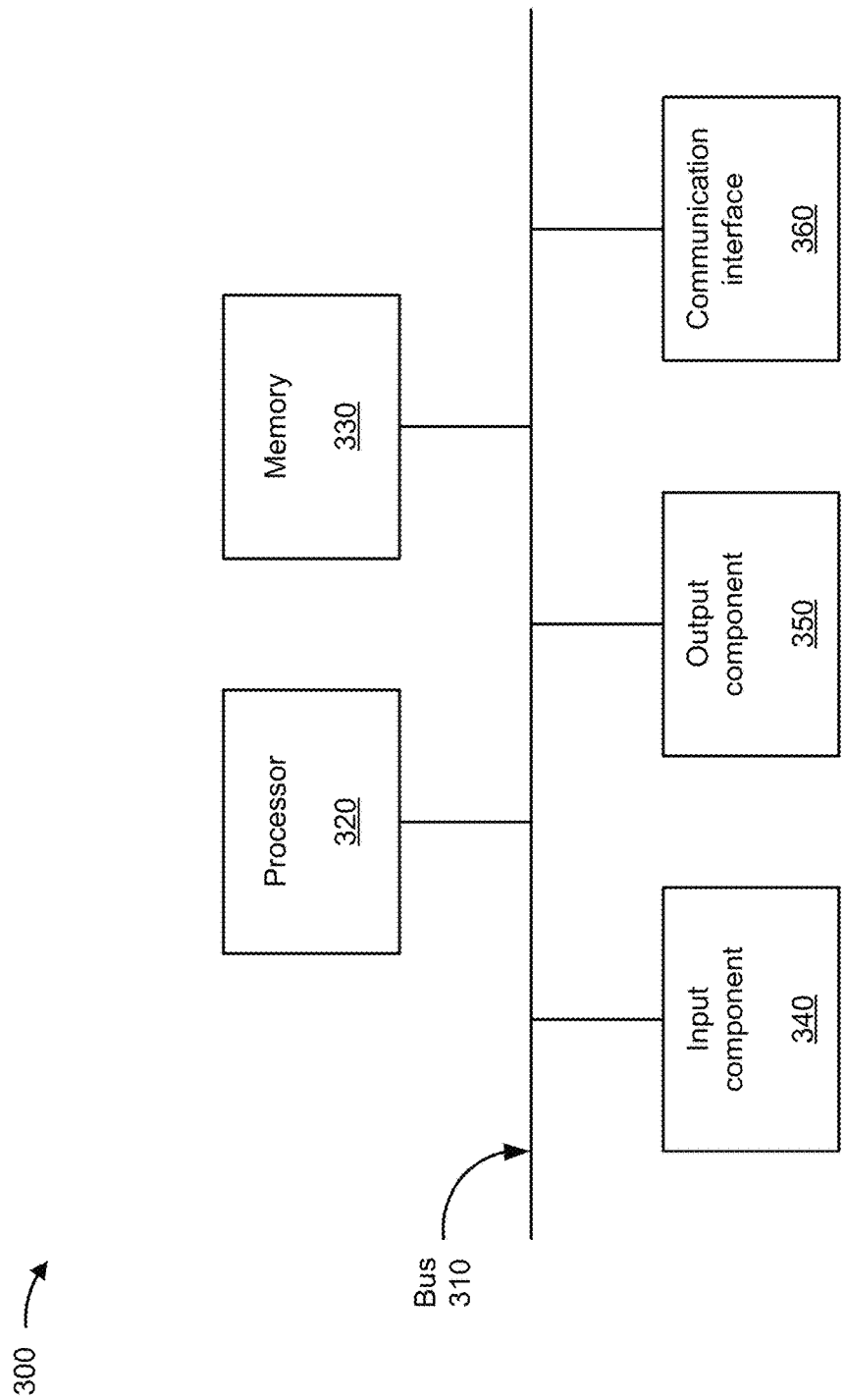
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210 and/or the network device 220. In some implementations, the endpoint device 210 and/or the network device 220 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
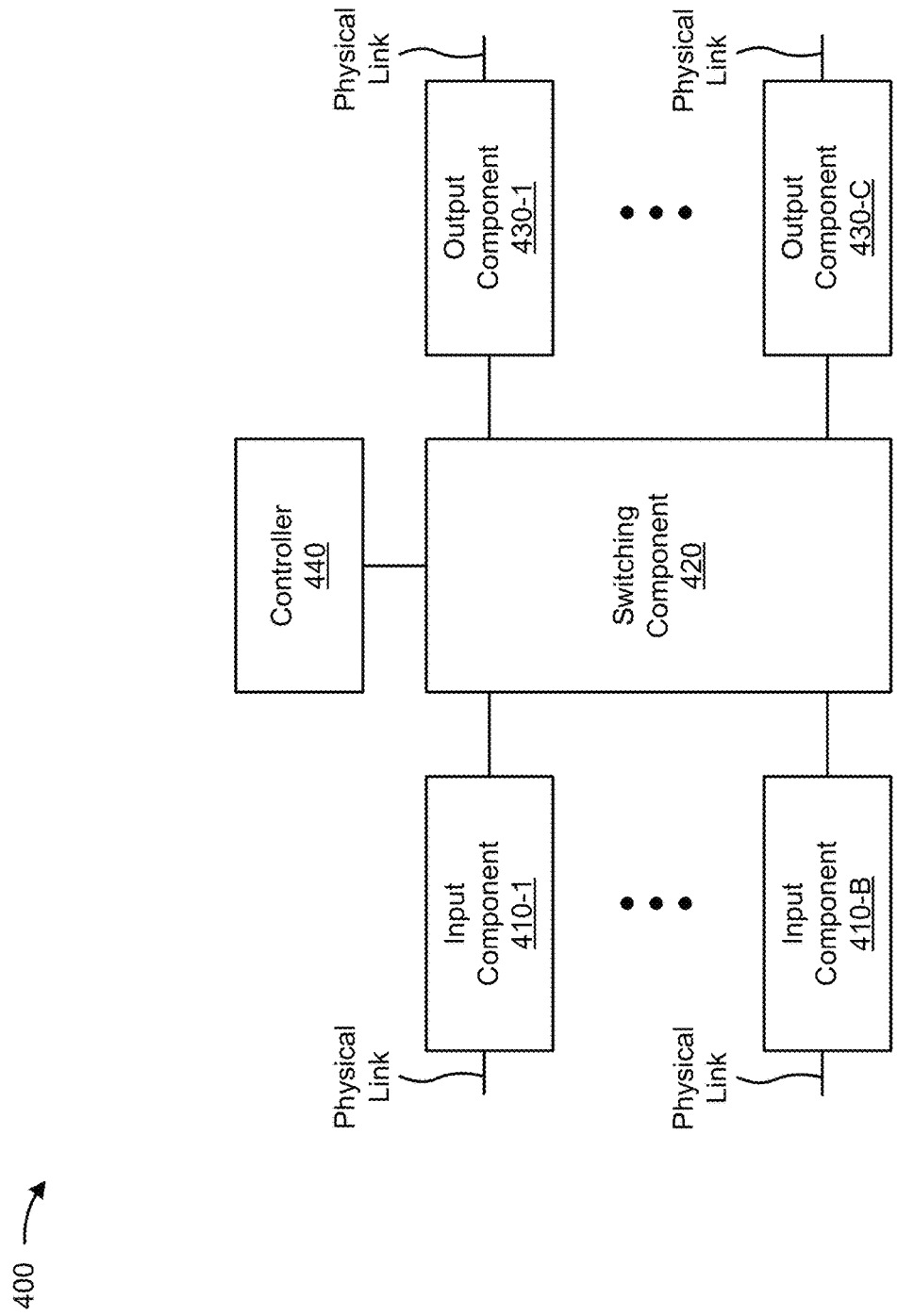

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
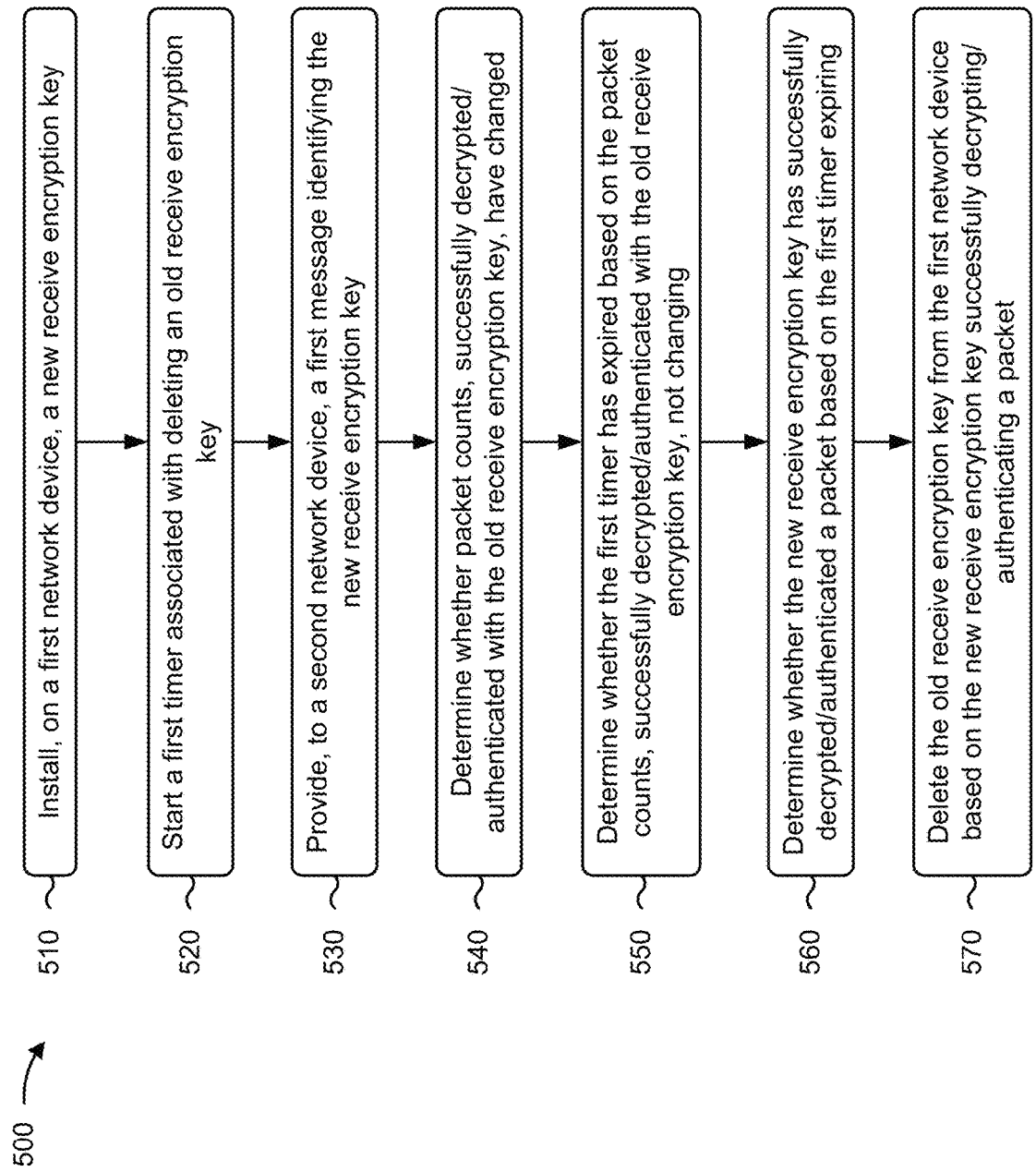
FIG. 5 is a flowchart of an example process for detecting and removing inactive encryption keys during encryption key rollover events.

FIG. 5 is a flowchart of an example process 500 for detecting and removing inactive encryption keys during encryption key rollover events. In some implementations, one or more process blocks of FIG. 5 may be performed by a network device (e.g., the network device 220). In some implementations, one or more process blocks of FIG. 5 may be performed by another device or a group of devices separate from or including the network device, such as an endpoint device (e.g., the endpoint device 210). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include installing, on the first network device, a new receive encryption key (block 510). For example, the first network device may install, on the first network device, a new receive encryption key, as described above.

As further shown in FIG. 5, process 500 may include starting a first timer associated with deleting an old receive encryption key (block 520). For example, the first network device may start a first timer associated with deleting an old receive encryption key, as described above. In some implementations, each of the new receive encryption key and the old receive encryption key is a MACsec key.

As further shown in FIG. 5, process 500 may include providing, to a second network device, a first message identifying the new receive encryption key (block 530). For example, the first network device may provide, to a second network device, a first message identifying the new receive encryption key, as described above. In some implementations, providing, to the second network device, the first message identifying the new receive encryption key includes providing a request to install the new receive encryption key to the second network device via a MKA control message.

As further shown in FIG. 5, process 500 may include determining whether packet counts, successfully decrypted/authenticated with the old receive encryption key, have changed (block 540). For example, the first network device may determine whether packet counts, successfully decrypted/authenticated with the old receive encryption key, have changed, as described above.

As further shown in FIG. 5, process 500 may include determining whether the first timer has expired based on the packet counts, successfully decrypted/authenticated with the old receive encryption key, not changing (block 550). For example, the first network device may determine whether the first timer has expired based on the packet counts, successfully decrypted/authenticated with the old receive encryption key, not changing, as described above.

As further shown in FIG. 5, process 500 may include determining whether the new receive encryption key has successfully decrypted/authenticated a packet based on the first timer expiring (block 560). For example, the first network device may determine whether the new receive encryption key has successfully decrypted/authenticated a packet based on the first timer expiring, as described above.

As further shown in FIG. 5, process 500 may include deleting the old receive encryption key from the first network device based on the new receive encryption key successfully decrypted/authenticating a packet (block 570). For example, the first network device may delete the old receive encryption key from the first network device based on the new receive encryption key successfully decrypted/ authenticating a packet, as described above. In some implementations, deleting the old receive encryption key from the first network device includes causing a control plane of the first network device to provide a deletion request to a data plane of the first network device, and causing the data plane of the first network device to delete the old receive encryption key based on the deletion request. In some implementations, deleting the old receive encryption key from the first network device includes deleting the old receive encryption key as part of a hitless key rollover by the first network device.

In some implementations, process 500 includes receiving, from the second network device, a first acknowledgement message indicating installation of the new receive encryption key by the second network device, and installing, on the first network device, a new transmit encryption key based on the first acknowledgement message. In some implementations, process 500 includes storing the new transmit encryption key in a hardware memory register of the first network device after installing the new transmit encryption key on a data plane of the first network device. In some implementations, the new transmit encryption key is a media access control security key.

In some implementations, process 500 includes starting a second timer associated with deleting an old transmit encryption key; providing, to the second network device, a second message identifying the new transmit encryption key; and utilizing the old receive encryption key and the old transmit encryption key, to encrypt traffic, until the second network device provides an acknowledgement of installation of the new transmit encryption key. In some implementations, process 500 includes determining whether packet counts, successfully encrypted with the old transmit encryption key, have changed; determining whether the second timer has expired based on the packet counts, successfully encrypted with the old transmit encryption key, not changing; and deleting the old transmit encryption key from the first network device based on the second timer expiring.

In some implementations, process 500 includes encrypting traffic with the new transmit encryption key to generate encrypted traffic, and causing the encrypted traffic to be provided to a destination. In some implementations, process 500 includes storing the new receive encryption key in a hardware memory register of the first network device after installing the new receive encryption key on a data plane of the first network device. In some implementations, process 500 includes decrypting traffic with the new receive encryption key to generate decrypted traffic, and causing the decrypted traffic to be provided to a destination.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   installing, on a first network device, a new receive encryption key;
   starting, by the first network device, a first timer associated with deleting an old receive encryption key;
   providing, by the first network device and to a second network device, a first message identifying the new receive encryption key;
   determining, by the first network device, whether packet counts, successfully decrypted with the old receive encryption key, have changed;
   determining, by the first network device, whether the first timer has expired based on the packet counts, successfully decrypted with the old receive encryption key, not changing;
   determining, by the first network device, whether the new receive encryption key has successfully decrypted a packet based on the first timer expiring; and
   deleting, by the first network device, the old receive encryption key from the first network device based on the new receive encryption key successfully decrypting the packet.

2. The method of claim 1, further comprising:
   receiving, from the second network device, a first acknowledgement message indicating installation of the new receive encryption key by the second network device; and
   installing, on the first network device, a new transmit encryption key based on the first acknowledgement message.

3. The method of claim 2, further comprising:
   storing the new transmit encryption key in a hardware memory register of the first network device after installing the new transmit encryption key on a data plane of the first network device.

4. The method of claim 2, wherein the new transmit encryption key is a media access control security key.

5. The method of claim 2, further comprising:
   starting a second timer associated with deleting an old transmit encryption key;
   providing, to the second network device, a second message identifying the new transmit encryption key; and
   utilizing the old receive encryption key and the old transmit encryption key, to encrypt traffic, until the second network device provides an acknowledgement of installation of the new transmit encryption key.

6. The method of claim 5, wherein the packet counts are first packet counts, and
   further comprising:
   determining whether second packet counts, successfully encrypted with the old transmit encryption key, have changed compared to the first packet counts;
   determining whether the second timer has expired based on the second packet counts, successfully encrypted with the old transmit encryption key, not changing compared to the first packet counts; and
   deleting the old transmit encryption key from the first network device based on the second timer expiring.

7. The method of claim 6, further comprising:
   encrypting traffic with the new transmit encryption key to generate encrypted traffic; and
   causing the encrypted traffic to be provided to a destination.

8. A first network device, comprising:
   one or more memories; and
   one or more processors to:
   install, on the first network device, a new receive encryption key;
   start a first timer associated with deleting an old receive encryption key;
   provide, to a second network device, a first message identifying the new receive encryption key;
   determine whether packet counts, successfully decrypted with the old receive encryption key, have changed;
   determine whether the first timer has expired based on the packet counts, successfully decrypted with the old receive encryption key, not changing;
   determine whether the new receive encryption key has successfully decrypted a packet based on the first timer expiring;
   delete the old receive encryption key from the first network device based on the new receive encryption key successfully decrypting the packet;
   receive, from the second network device, a first acknowledgement message indicating installation of the new receive encryption key by the second network device; and
   install, on the first network device, a new transmit encryption key based on the first acknowledgement message.

9. The first network device of claim 8, wherein the one or more processors are further to:
   store the new receive encryption key in a hardware memory register of the first network device after installing the new receive encryption key on a data plane of the first network device.

10. The first network device of claim 8, wherein the one or more processors, to delete the old receive encryption key from the first network device, are to:
    cause a control plane of the first network device to provide a deletion request to a data plane of the first network device; and
    cause the data plane of the first network device to delete the old receive encryption key based on the deletion request.

11. The first network device of claim 8, wherein each of the new receive encryption key and the old receive encryption key is a media access control security key.

12. The first network device of claim 8, wherein the one or more processors, to provide, to the second network device, the first message identifying the new receive encryption key, are to:
    provide a request to install the new receive encryption key to the second network device via a media access control security key agreement control message.

13. The first network device of claim 8, wherein the one or more processors are further to:
    decrypt traffic with the new receive encryption key to generate decrypted traffic; and
    cause the decrypted traffic to be provided to a destination.

14. The first network device of claim 8, wherein the one or more processors, to delete the old receive encryption key from the first network device, are to:
    delete the old receive encryption key as part of a hitless key rollover by the first network device.

15. A non-transitory computer-readable medium storing a set of instructions, the set of instructions comprising:

one or more instructions that, when executed by one or more processors of a first network device, cause the first network device to:
- install, on a first network device, a new receive encryption key;
- store the new receive encryption key in a hardware memory register of the first network device after installing the new receive encryption key;
- start a first timer associated with deleting an old receive encryption key;
- provide, to a second network device, a first message identifying the new receive encryption key;
- determine whether packet counts, successfully decrypted with the old receive encryption key, have changed;
- determine whether the first timer has expired based on the packet counts, successfully decrypted with the old receive encryption key, not changing;
- determine whether the new receive encryption key has successfully decrypted a packet based on the first timer expiring;
- delete the old receive encryption key from the first network device based on the new receive encryption key successfully decrypting the packet;
- receive, from the second network device, a first acknowledgement message indicating installation of the new receive encryption key by the second network device; and
- install, on the first network device, a new transmit encryption key based on the first acknowledgement message.

16. The non-transitory computer-readable medium of claim 15, wherein the one or more instructions further cause the first network device to:
- store the new transmit encryption key in the hardware memory register of the first network device after installing the new transmit encryption key on a data plane of the first network device.

17. The non-transitory computer-readable medium of claim 15, wherein each of the new receive encryption key, the old receive encryption key, and the new transmit encryption key is a media access control security key.

18. The non-transitory computer-readable medium of claim 15, wherein the packet counts are first packet counts, and
wherein the one or more instructions further cause the first network device to:
- start a second timer associated with deleting an old transmit encryption key;
- provide, to the second network device, a second message identifying the new transmit encryption key;
- determine whether second packet counts, successfully encrypted with the old transmit encryption key, have changed from the first packet counts;
- determine whether the second timer has expired based on the second packet counts, successfully encrypted with the old transmit encryption key, not changing compared to the first packet counts; and
- delete the old transmit encryption key from the first network device based on the second timer expiring.

19. The non-transitory computer-readable medium of claim 18, wherein the one or more instructions further cause the first network device to:
- encrypt traffic with the new transmit encryption key to generate encrypted traffic; and
- cause the encrypted traffic to be provided to a destination.

20. The non-transitory computer-readable medium of claim 15, wherein the one or more instructions, that cause the first network device to delete the old receive encryption key from the first network device, cause the first network device to:
- cause a control plane of the first network device to provide a deletion request to a data plane of the first network device; and
- cause the data plane of the first network device to delete the old receive encryption key based on the deletion request.

* * * * *